United States Patent
Rozewski et al.

(10) Patent No.: US 12,093,626 B2
(45) Date of Patent: Sep. 17, 2024

(54) SELECTIVE EXTRACTION OF DESIGN LAYOUT

(71) Applicant: Hewlett Packard Enterprise Development LP, Houston, TX (US)

(72) Inventors: Dustin Joseph Rozewski, Fort Collins, CO (US); Rick R. Darner, Firestone, CO (US); John D. Corbeil, Jr., Fort Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 375 days.

(21) Appl. No.: 17/671,268

(22) Filed: Feb. 14, 2022

(65) Prior Publication Data
US 2023/0259683 A1  Aug. 17, 2023

(51) Int. Cl.
| | | |
|---|---|---|
| *G06F 30/392* | (2020.01) | |
| *G06F 30/12* | (2020.01) | |
| *G06F 30/327* | (2020.01) | |

(52) U.S. Cl.
CPC ............ *G06F 30/392* (2020.01); *G06F 30/12* (2020.01); *G06F 30/327* (2020.01)

(58) Field of Classification Search
CPC .................................................... G06F 30/392
USPC .......................................................... 716/119
See application file for complete search history.

(56) References Cited

U.S. PATENT DOCUMENTS

| | | | |
|---|---|---|---|
| 5,999,726 A | 12/1999 | Ho | |
| 2012/0151431 A1* | 6/2012 | Huijbregts | G06F 30/392 |
| | | | 716/131 |

OTHER PUBLICATIONS

Elmaghraby, Y., "Efficient Parasitic Extraction Techniques for Full-Chip Verification," May 26, 2016, https://blogs.sw.siemens.com/calibre/2016/05/26/efficient-parasitic-extraction-techniques-for-full-chip-verification/.
Shah, O. et al., "Extraction Techniques for High-performance, High-capacity Simulation," White Paper, Sep. 2009, 8 pages.

* cited by examiner

*Primary Examiner* — Eric D Lee
(74) *Attorney, Agent, or Firm* — Yao Legal Services, Inc.

(57) ABSTRACT

One aspect of the application provides a system and method for facilitating a selective extraction of design layout. During operation, the system can generate, based on an electronic circuit design, a first list of nets and a first design layout corresponding to the electronic circuit design. The system can receive, via one or more user interactive elements on a graphical user interface, a list of nets including a first subset of nets from the first list of nets. Further the system can determine, based on the second list of nets, a set of leaf-cells. The system may extract the first subset of the nets and the set of leaf-cells from the first design layout and copy them to a new display on the graphical user interface to represent a new design layout. The system can then provide the new design layout to a layout parameter extraction process.

20 Claims, 7 Drawing Sheets

SELECTIVE EXTRACTION OF DESIGN LAYOUT

BACKGROUND

Advancements in integrated circuit (IC) technology have resulted in a rapid increase in the size and complexity of IC designs. For example, a single semiconductor chip can include a high density of circuit elements, e.g., millions to billions of transistors that are interconnected to perform a number of functionalities. In addition, the semiconductor chip can include a large number of metal layers in proximity which can introduce parasitic effects on the IC design. The introduction of such parasitic effects can impact the desired functionality of the IC design. Parasitic extraction tools are applied to extract and analyze the parasitic elements in the IC design, following which other EDA tools are applied to verify correct operation of the IC design.

BRIEF DESCRIPTION OF THE FIGURES

In the figures, like reference numerals refer to the same figure elements.

DETAILED DESCRIPTION

The following description is provided in the context of a particular application and its requirements. Various modifications to the disclosed examples will be readily apparent to those skilled in the art, and the general principles defined herein may be applied to other examples and applications without departing from the spirit and scope of the present disclosure. Thus, the scope of the present disclosure is not limited to the examples shown but is to be accorded the widest scope consistent with the principles and features disclosed herein.

There is a trade-off between IC density and parasitic effects. These parasitic effects can be introduced due to the inherent problem of metal layers being in proximity with each other in such a high-density IC design. The IC design layout can include parasitic resistances and capacitances which are introduced by the interconnections and devices in the IC design layout. These parasitics, e.g., parasitic resistances, capacitances, etc., may impact the performance and the functionality of the IC. Therefore, when designing an IC, these parasitics are extracted from the IC design layout, analyzed, and provided to a circuit simulation tool for verifying the functionality of the IC design. Several parasitic extraction tools are available that process the entire IC design layout to extract a large number of nets, i.e., representations of electrical connections between circuit elements included in the IC design layout, that introduce parasitic effects and store the large amount of extracted information in memory.

With the increase in the size and complexity of IC designs, the parasitic extraction tools may have to extract and store large amount of data, which significantly increases the runtime and burdens the system resources, e.g., system memory. Furthermore, since downstream simulation tools continue to process the entire IC design and results of the parasitic extraction, the runtime of these simulation tools increases, thereby resulting in a computationally intensive IC design verification. Existing systems, prior to applying parasitic extraction tool and simulation tools, deploy an intermediate layout parameter extraction (LPE) tool which would waste time processing net shapes that can be irrelevant to the nets that are to be analyzed. With the increase in size and complexity of the IC designs, LPE can be a limiting factor in terms of runtime and/or memory.

In some existing systems, LPE has an option to apply two types of groupings of cells, e.g., a block or gray box around certain cells in the IC design layout to exclude them from being processed. A cell can correspond to a set of transistors and interconnections for implementing a logic function or a store function. For example, applying a black box around certain cells may remove them entirely for further processing. On the other hand, applying a gray box around certain cells indicate that the processing of the internal components of these cells will be skipped, and the net shapes will be considered for performing extraction. One of the problems with this approach is that the black and/gray box options operate at an all-or-none per block level, which means that it may not be possible to include blocks without also including irrelevant design content with the black boxes.

Some of the aspects described in this application provide a technical solution to the above-mentioned problems. Specifically, a system and method are provided that can perform a selective extraction of design layout. For example, the system may receive a large IC design corresponding to an electronic circuit block in a semiconductor chip and may receive a user-specified list of nets via a graphical user interface (GUI) or a text file. The user-specified nets can represent a subset of all nets in the design which the user is interested in analyzing. The user may input the user-specified nets via one or more user interactive elements on the GUI. In response to receiving the user-specified nets, the system can extract the user-specified nets of interest along with leaf-cells associated with these nets and copy them to a new view or a new design layout on the GUI. In other words, the new design may include net shapes and leaf-cells associated with user-specified nets, while other nets not included in the user-specified nets may not be represented in the new design layout.

Furthermore, to incorporate the parasitic effects of other net shapes or metal layers in the large IC design on the selected nets (or user-specified nets), the system may identify one or more of the other net shapes near the selected nets that can have a parasitic effect on the selected nets. The system can then extract these one or more other net shapes and copy them to the new view on the GUI, thereby including the parasitic components that might have an impact on the user-specified nets. The system can then provide this new design which is a significantly reduced version of the large IC design, to a regular design flow for performing layout parameter extraction. Such an approach can facilitate the simulation of minimum set of components while including the parasitic context of the large IC design.

The term "nets" refers to a representation of electrical connections between circuit elements included in the electronic circuit. The terms "nets" and "list of nets" have been used interchangeably in this disclosure.

The term "leaf-cell" refers to a fundamental building block implementing a logic function or a store function in the electronic circuit.

The term "net shape" refers to a shape of interconnections (e.g., metal traces) between two circuit components.

System Architecture

Figure 1:
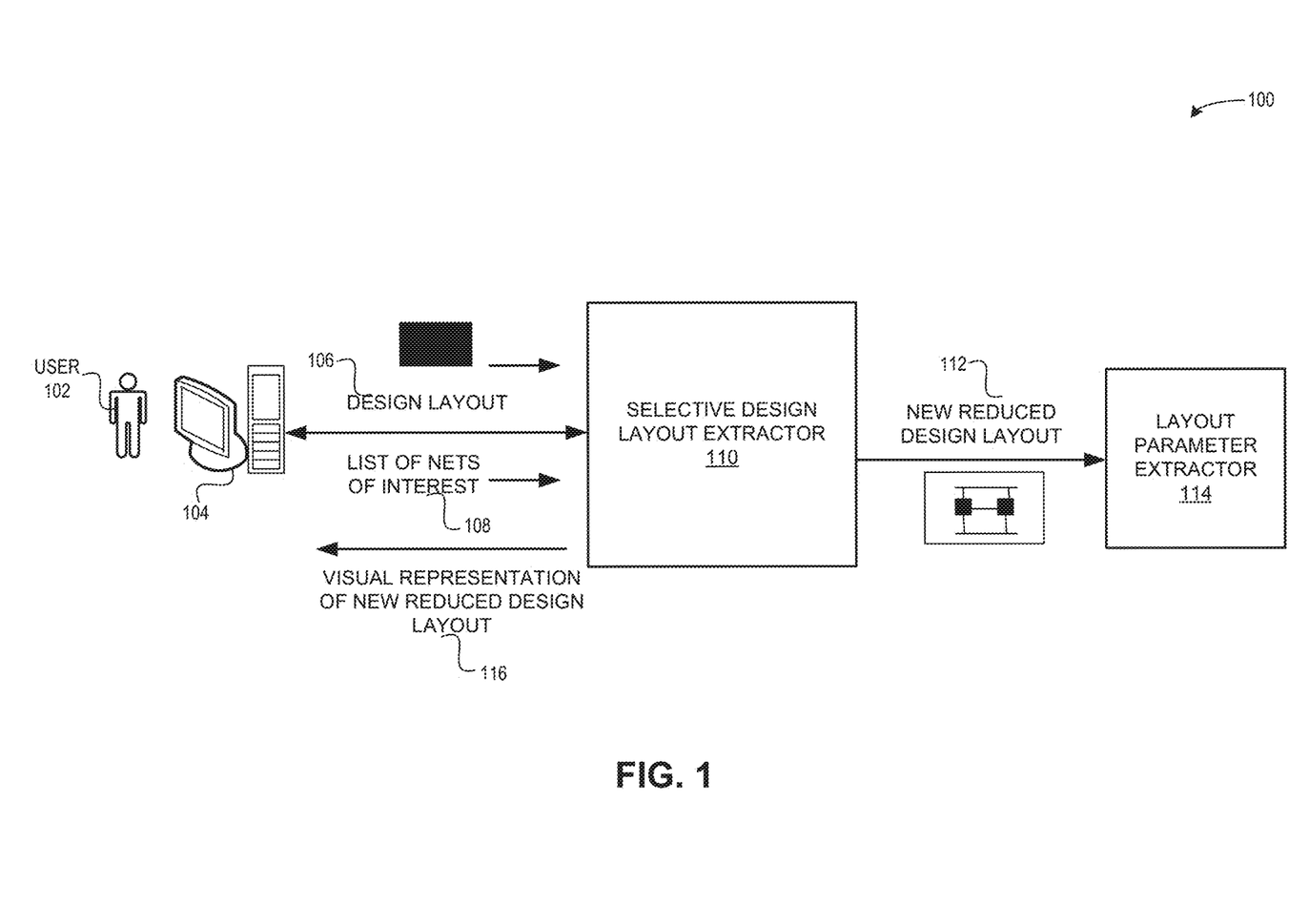
FIG. 1 illustrates an example schematic block diagram including a selective design layout extractor, according to one aspect of the instant application.

FIG. 1 illustrates an example block diagram including a selective design layout extractor, according to one aspect of the instant application. In the example shown in FIG. 1, system 100 includes a selective design layout extractor 110 which can receive via a GUI a design layout 106 of a large circuit block included in a semiconductor chip and a schematic corresponding to design layout 106. A schematic can be a graphical representation of a netlist. Performing a full parasitic simulation on design layout 106 would be time consuming and inefficient. For example, when user 102 is interested in clock nets included in design layout 106, performing a full parasitic simulation on design layout 106 may result in processing net shapes that are irrelevant to the clock nets that the user is interested in analyzing.

One aspect of the instant application can provide a GUI on a display device 104, the GUI can include one or more interactive interface elements to enable user 102 to provide a list of nets that user 102 may be interested in analyzing and verifying the design. For example, if the user is interested in clock networks and analyzing the parasitic effects on these clock networks, then the user may provide clock nets as list of nets of interest 108 to selective design layout extractor 110. In one aspect, the user may provide list of nets of interest 108 in text format via the GUI, e.g., the user may copy list of nets 108 to a file and provide this file in text format as input to selective design layout extractor 110.

Based on the received design layout 106, a schematic corresponding to design layout 106, and user provided list of nets 108, selective design layout extractor 110 may extract list of nets 108, e.g., clock nets or other types of user-specified nets, from design layout 106. Selective design layout extractor 110 may trace a respective net in list of nets 108 to identify leaf-cells and generate a visual representation of a new reduced design layout 116. For example, selective design layout extractor 110 can copy the extracted nets of interest into a new view on the GUI. In other words, selective design layout extractor 110 can display visual representation of new reduced design 116 on display device 104 via the GUI in a new view, thereby enabling user 102 to view and interact with design 116. Visual representation of new reduced design 116 may include list of nets 108 and the associated leaf-cells.

In one aspect, selective design layout extractor 110 may identify metal layers near the net shapes associated with list of nets 106 that can have a parasitic impact on new reduced design layout 112. Selective design layout extractor 110 may update new reduced design layout 112 and visual representation of new reduced design layout 116 with the identified metal layers, thereby incorporating the parasitic context of complete design layout 106. Selective design layout extractor may then provide the updated new reduced design layout 112 with a corresponding schematic to a regular design flow, e.g., a layout parameter extractor 114 for performing layout parameter extraction. Therefore, selective design layout extractor 110 can trim down irrelevant net shapes, retain relevant net shapes based on user-specified nets, and retain parasitic effects on the relevant nets in the context of design layout 106; thereby providing a minimum set of components to perform layout parameter extraction while including the parasitic context of the larger design, i.e., design 106.

Figure 2:
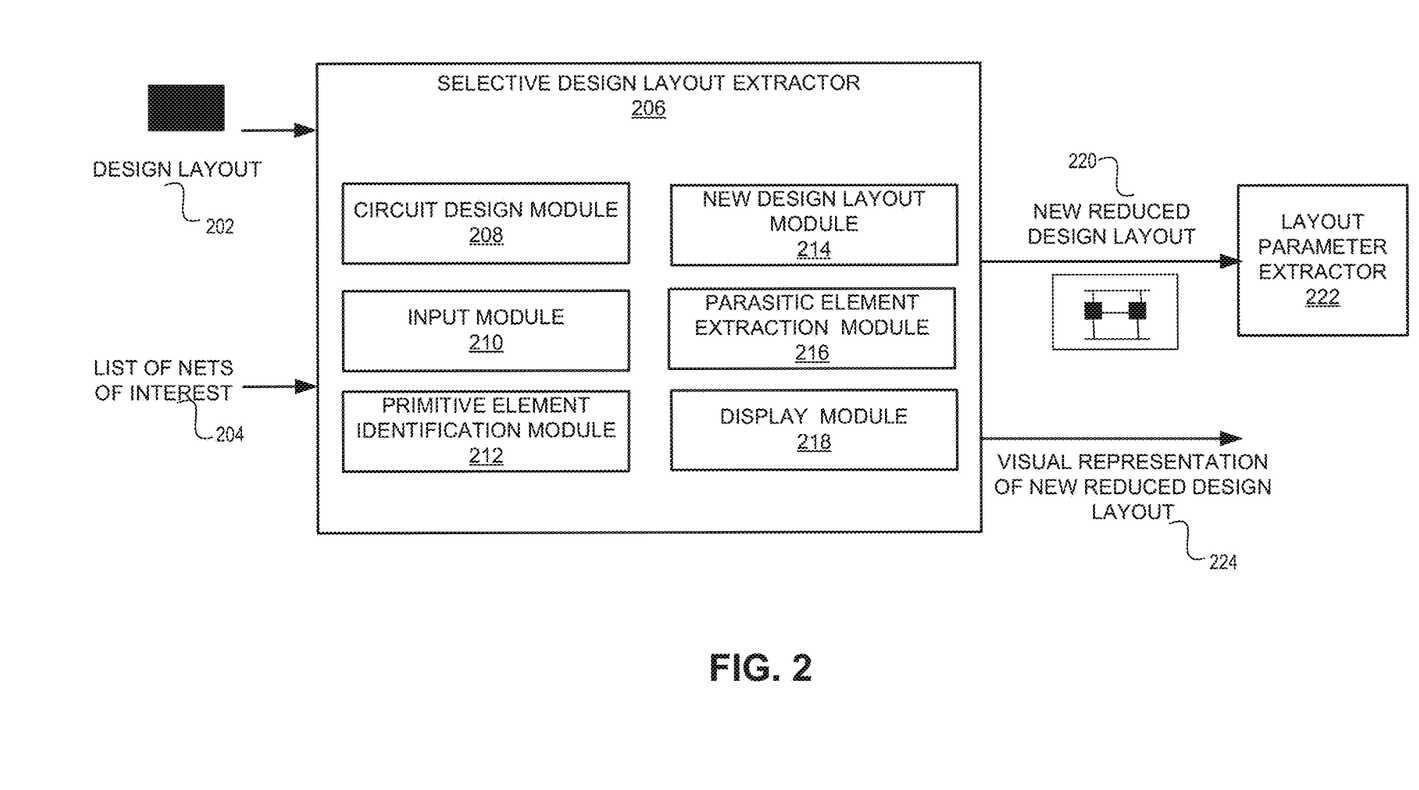
FIG. 2 illustrates an example system architecture for facilitating selective extraction of a design layout, according to one aspect of the instant application.

FIG. 2 illustrates an example system architecture for facilitating selective extraction of a design layout, according to one aspect of the instant application. In the example shown in FIG. 2, selective design layout extractor 206 can include a circuit design module 208 for receiving a design layout 202 of a relatively large circuit block included in a semiconductor chip. Display module 218 may display a visual representation of design layout 202 on a display device (not shown in FIG. 2) via a GUI.

Performing layout parameter extraction on such a large design layout 202 can be computationally intensive and time consuming. Some of the existing parasitic extraction tools are downstream tools and a layout parameter extraction tool is applied as an upstream tool which would have to operate on the entire design, e.g., design 202, of the circuit block before providing the list of nets and a schematic for design 202 to a downstream parasitic extraction tool. The layout parameter extraction tool has to analyze and process the entire design, which means that the tool may have to waste time to process a large amount of information associated with irrelevant net shapes, i.e., net shapes that can be irrelevant in the context of the nets the user is interested in analyzing, thereby increasing its runtime and amount of memory utilization.

Selective design layout extractor 206 can overcome the problem of processing irrelevant net shapes or nets, by selecting user-specified nets from design layout 202. Selective design layout extractor 206 can include an input module 210 to provide a customized GUI which enables a user to provide list of nets of interest 204. For example, system 200 may store a complete list of nets in a database and display module 218 may display via the GUI this complete list of nets. A user may select via the GUI certain nets of interest from the complete list of nets and copy the list of selected nets to a text file. In one aspect, input module 210 can provide one or more user-interactive interface elements on the GUI to receive a user-specified list of nets. In other words, when a user is interested in analyzing certain nets or content in design layout 202, the user can input a list of nets of interest via the user-interactive interface elements on the GUI. For example, the user may input list of nets of interest 204 as a file in text format.

Based on list of nets 204, selective layout design extractor 206 may apply a primitive element identification module 212 to trace a respective net from list of nets in the IC design layout to identify primitives or leaf-cells associated with the net. In other words, module 212 can trace the user-specified nets of interest, i.e., nets 204, in given design layout 202 until low-level circuit blocks including primitives or leaf-cells are identified. For example, when list of nets of interest 204 correspond to clock nets, primitive element identification module 212 may trace respective clock nets to identify buffers (which represent the leaf-cells) in the clock nets.

In other words, primitive element identification module 212 can perform connectivity extraction by accessing a database in memory (or an open access database) to search for gates that are connected to a respective user-specified net in nets 204. Specifically, primitive element identification module 212 can search for a label (e.g., a label can be associated with a cell in nets 204) and then determine a first set of net shapes that are overlapping or located within a first threshold proximity with (or in the neighborhood of) the label and a second set of net shapes that are overlapping or located within a second threshold proximity with (or in the neighborhood of) the first set of net shapes. A cell can correspond to a circuit block including a set of transistors and interconnections for implementing a logic function or a store function. In response to identifying the first set of net shapes and the second set of net shapes, primitive element identification module 212 can process these shapes to identify a lowest-level block associated with nets 204. For example, in a clock network the clock value is buffered, which means that the lowest-level block in this case can be a buffer. When nets 204 correspond to clock nets, primitive element identification module 212 may find buffers (or leaf-cells) associated with a respective clock net.

Selective design layout extractor 206 may then input the identified leaf-cells corresponding to the lowest-level block, the net shapes associated with list of nets of interest 204, and corresponding geometric parameters to a new design layout module 214. The geometric parameters can include length, width, location of metal traces associated with the net shapes. System 200 can retrieve these geometric parameters associated with the net shapes from a database stored in memory (or an open access database).

New design layout module 214 may create a new view on the GUI and generate a visual representation of a new reduced design layout based on the identified leaf-cells and net shapes. For example, when the list of nets of interest 204 correspond to clock nets, the new reduced design layout may include clock nets with the associated buffers while excluding other nets not selected or specified by the user in list of nets 204. Therefore, selective design layout extractor 206 can significantly reduce the size of original design 204 to a simplified design layout, e.g., clock nets or other types of user-specified nets from design layout 202.

In one aspect, if the user desires to remove one or more circuit elements from the reduced design layout, the user can do so by interacting with the GUI and selecting the parts the user is not interested in. Reduced design layout module 214 can then update the new reduced design layout based on the changes input by the user via the GUI. Therefore, selective design layout extractor 206 can simulate a part of the design layout that the user is interested instead of simulating the entire design layout. In other words, by simplifying the design layout before providing it to EDA tools, e.g., layout parameter extraction tool, design verification tool, etc., system 200 can significantly reduce the runtime, memory utilization of these EDA tools, and can also reduce the time-to-market.

Selective design layout extractor 206 can provide user-friendly viewing of a reduced design layout that is to be simulated. In other words, new design layout module 214 can build a new view or a new design layout that a user can visualize and interact with via the GUI.

In one aspect of the application, selective design layout extractor 206 may apply a parasitic element extraction module 216 to identify other net shapes (e.g., metal traces) near list of nets 204 that may have a parasitic impact on nets 204 copied to the new design layout. In response to identifying these other net shapes, parasitic element extraction module 216 may provide information related to these other net shapes to new design layout module 214. For example, the information related to these other net shapes can include their location in design layout 202 and the parasitic impact they may have on the nets in the new reduced design layout.

New design layout module 214 may copy the other net shapes and the related information to the new reduced design layout. Display module 218 can then display the visual representation of the new reduced design layout 224 in the new view on the GUI. The new view incudes nets indicated in list of nets 204, i.e., the user-specified nets, and other nets that introduce parasitic effects on the user-specified nets; the remaining nets in design layout 202 are not represented in the new view.

Selective design layout extractor 206 may provide new reduced design layout 220 to a layout parameter extractor 222 for implementing a regular design flow for layout parameter extraction which can be followed by parasitic extraction and simulation. Therefore, with selective design layout extractor 206, layout parameter extractor 222 can operate on a reduced design layout instead of performing layout parameter extraction on design layout 202, thereby significantly reducing the simulation runtime and time-to-market of the IC design.

Figure 3A:
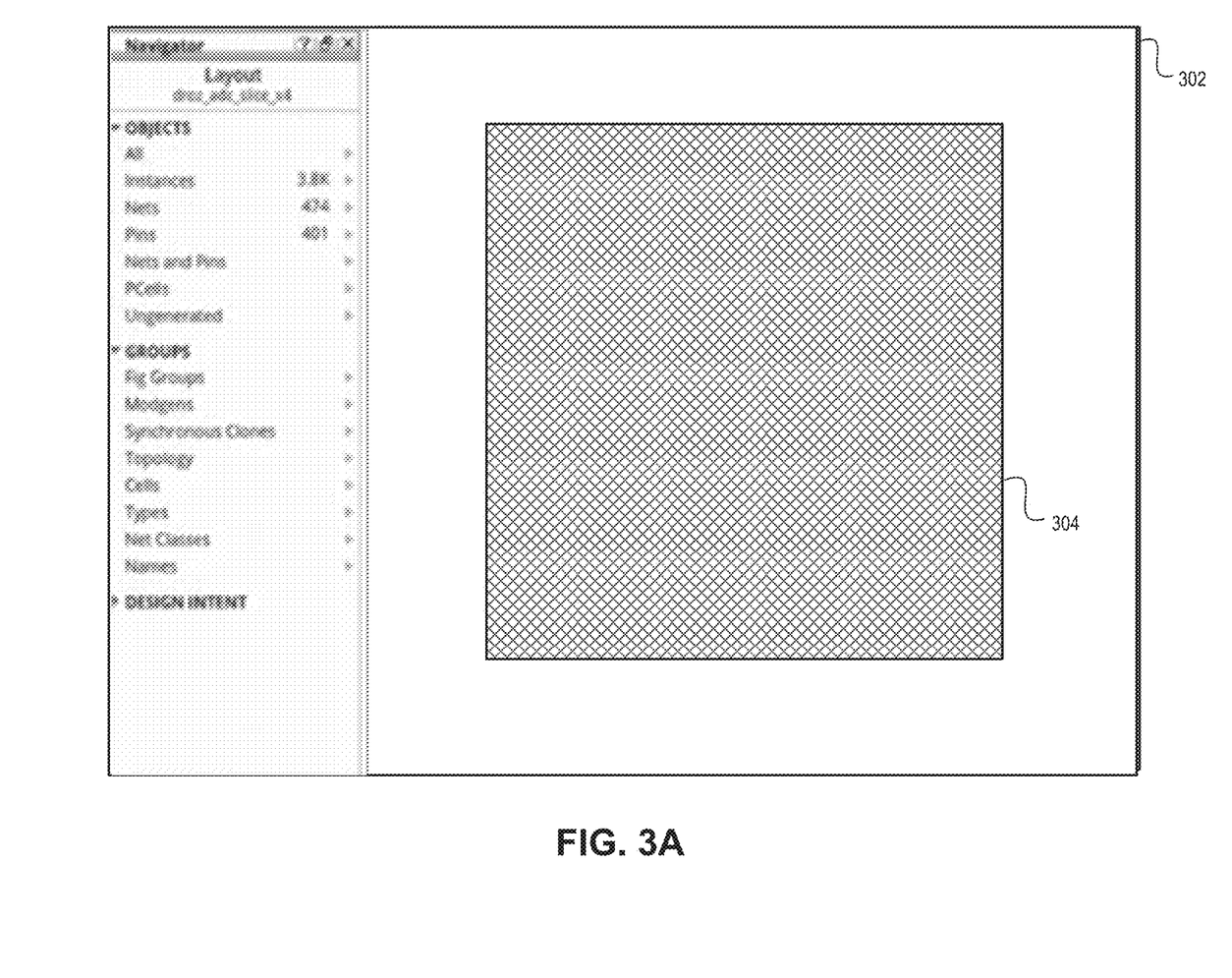
FIG. 3A illustrates an example representation of a graphical user interface displaying a design layout, according to one aspect of the instant application.

FIG. 3A illustrates an example representation of a graphical user interface displaying a design layout, according to one aspect of the instant application. The example graphical user interface 302 shown in FIG. 3A, a visual representation of a circuit block 304 inside a semiconductor chip. Circuit block 304 can include about hundreds of nets, e.g., over five hundred nets. Performing layout parameter extraction on such a high-density circuit block can be computationally intensive and time consuming.

Figure 3B:
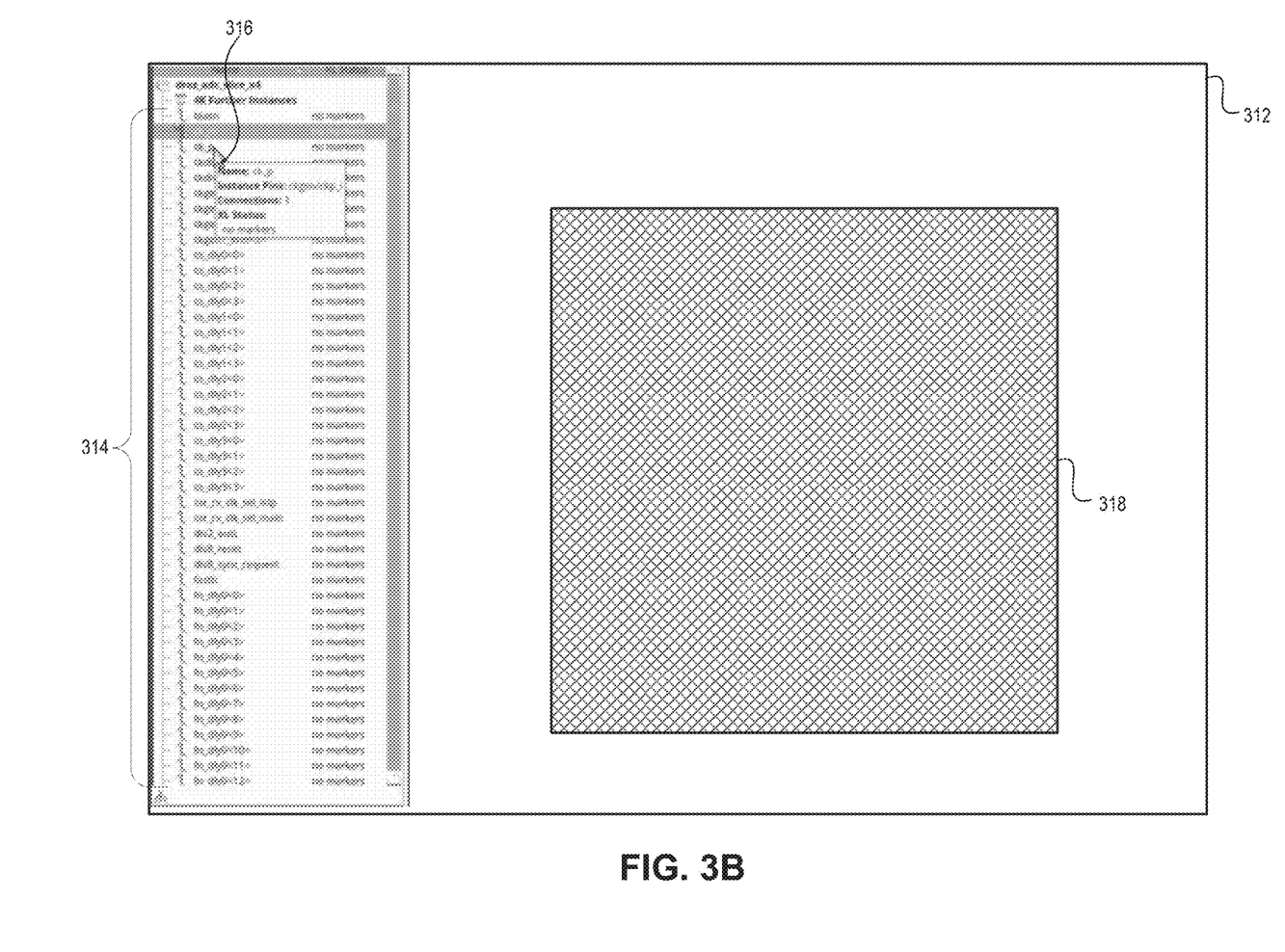
FIG. 3B illustrates an example representation of a graphical user interface displaying a design layout and a list of nets, according to one aspect of the instant application.

FIG. 3B illustrates an example representation of a graphical user interface displaying a design layout and a list of nets, according to one aspect of the instant application. In the example shown in FIG. 3B, GUI 312 in addition to displaying a visual representation of a circuit block 318 can also display a list of nets 314 including a list of nets in circuit block 318. In other words, a user can view the different nets available in circuit block 318. Further, the user who is familiar with the circuit design in circuit block 318 can select one or more nets in list of nets 314 that the user may be interested in analyzing and simulating. For example, if the user is interested in analyzing certain nets, the user may select the nets of interest, e.g., the user may select clock nets 316, and copy them to a text file. One aspect of the application can provide one or more user interactive graphical user interface elements to enable a user to input selected nets 316 for creating a new design.

Figure 3C:
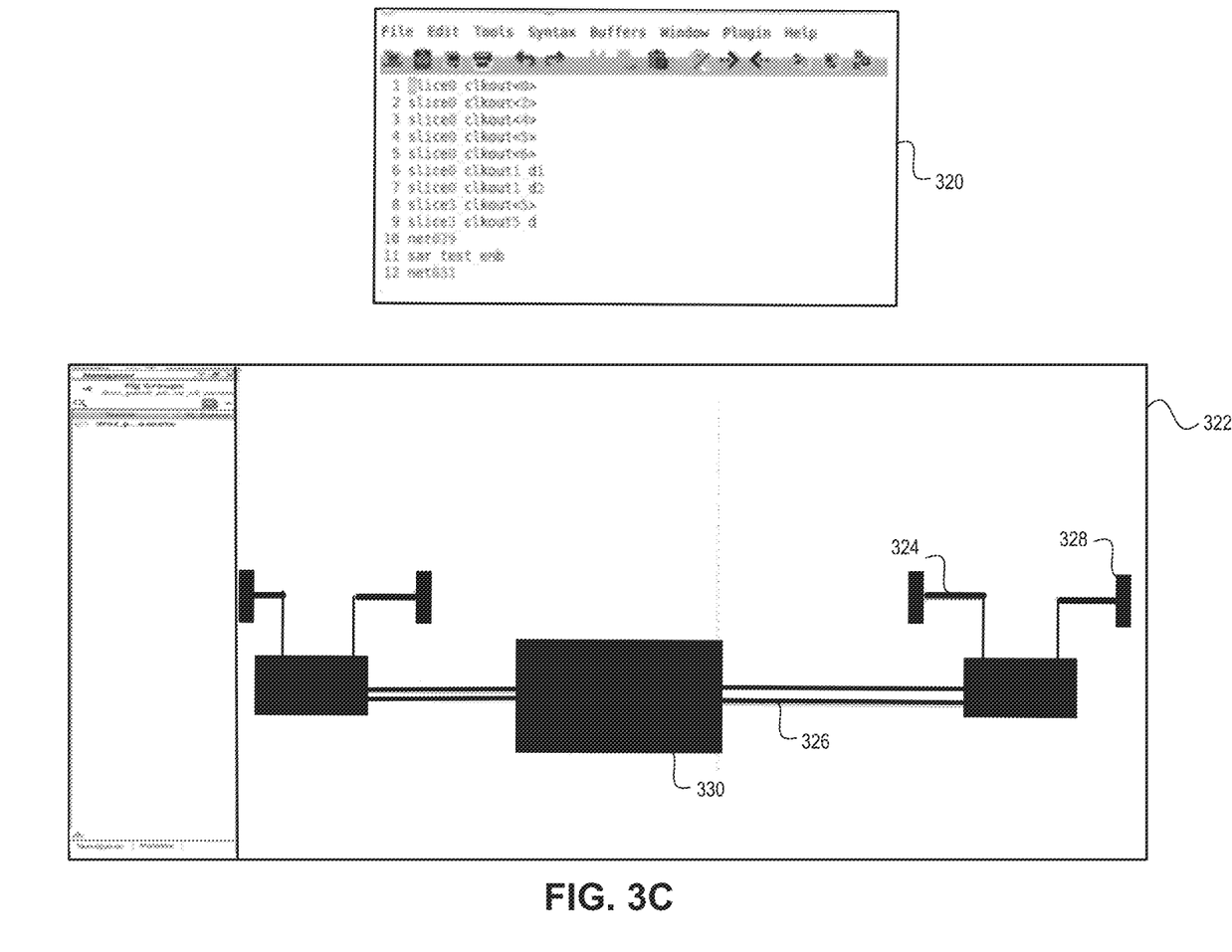
FIG. 3C illustrates an example of a user-specified list of nets of interest and an example representation of a graphical user interface displaying a simplified design layout in a new view, according to one aspect of the instant application.

FIG. 3C illustrates an example of a user-specified list of nets of interest and an example representation of a graphical user interface displaying a simplified design layout in a new view, according to one aspect of the instant application. The example shown in FIG. 3C, depicts a user-specified list of nets 320, e.g., clock nets, which the user can provide as input to the selective design layout extractor via a GUI. A user familiar with the design layout can determine which nets are to be considered for performing parasitic analysis and verification. For example, the user may select clock nets (shown in FIG. 3B) copy the selected nets to a text file 320. The user may then input selected nets 320 to a selective design layout extractor via one or more user interactive elements on the GUI. The selective design layout extractor can then extract the user-specified nets of interest along with the leaf-cells associated with the nets and copy them to a new view 322 on the GUI.

New view 322 depicts a reduced or a simplified design layout, e.g., for clock nets with one or more circuit elements 330, including leaf-cells 328 which correspond to buffers in a clock net. Elements 324 and 326 can represent metal lines or traces in the reduced design layout. In one aspect, the selective design layout extractor can determine additional metal traces near the user-specified nets that can have parasitic effect on the reduced design. The system can then update the reduced design layout by copying these metal traces or net shapes to the reduced design layout, thereby including the parasitic context of the larger design in the reduced design layout.

Figure 4:
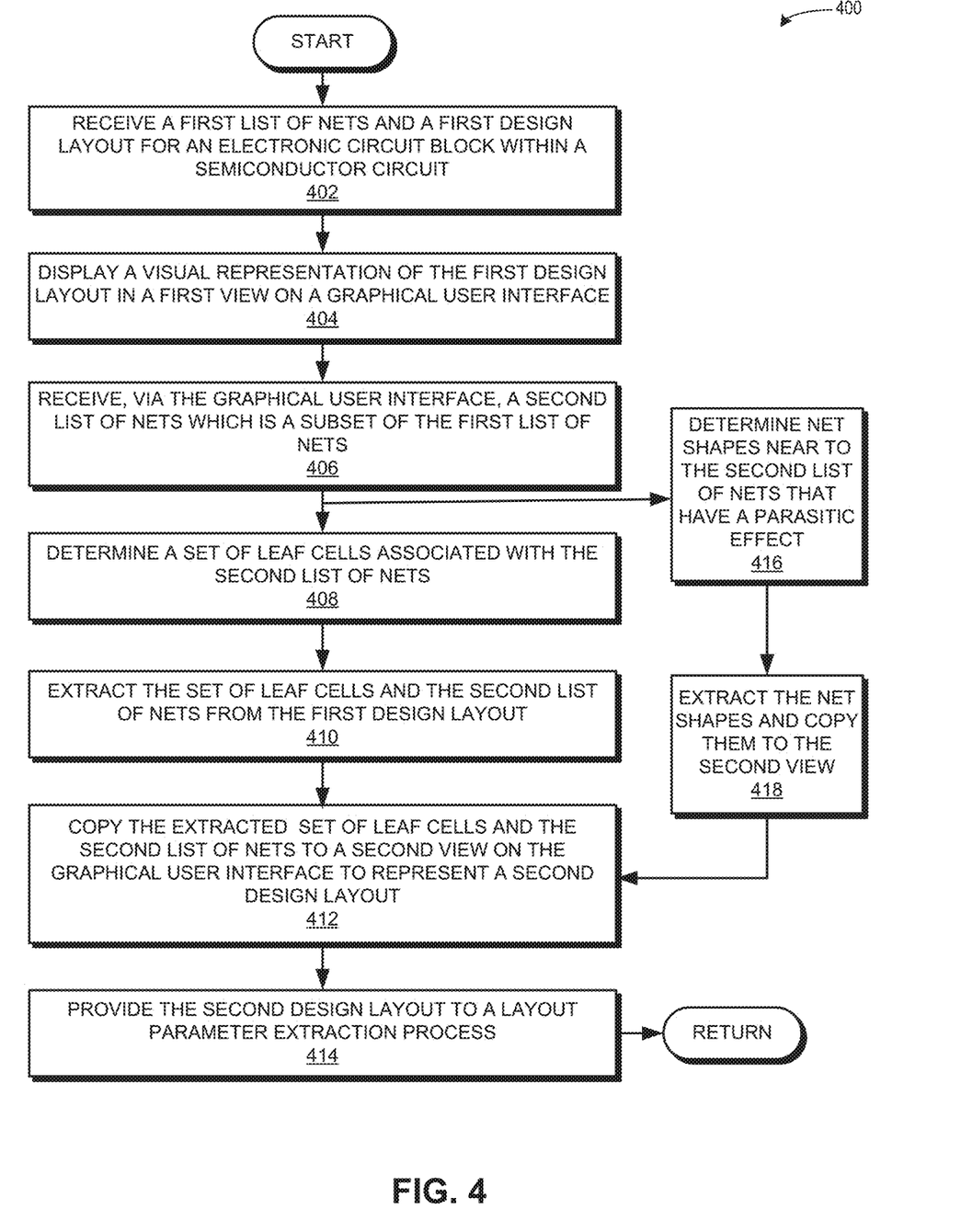
FIG. 4 presents a flowchart illustrating an example process for performing selective extraction of a design layout, according to one aspect of the instant application.

FIG. 4 presents a flowchart illustrating an example process for performing selective extraction of a design layout, according to one aspect of the instant application. Referring to flowchart 400 in FIG. 4, during operation, the system (i.e., the selective design layout extractor) can generate, based on an electronic circuit design, a first list of nets associated with a first design layout of an electronic circuit block within a large semiconductor circuit (operation 402). The system may display a visual representation of the first design layout in a first view on a GUI (operation 404). The electronic circuit block can include a large number of nets and performing layout parameter extraction on such an electronic circuit block can be computationally intensive and time consuming.

The system can serve as an upstream tool for extracting certain nets from the first design layout instead of providing the entire design layout or the first design layout to the layout parameter extraction tools. Specifically, the system can provide one or more user-interactive elements on the GUI to receive a user-specified list of nets, i.e., a second netlist, which is a significantly small subset of the nets present in the design (operation 406). In response to receiving the list of nets, the system may trace them to identify leaf-cells or fundamental building blocks associated with the second list of nets (operation 408). For example, the specified nets or the second list of nets can correspond to clock nets and the leaf-cells can correspond to buffers associated with the clock nets.

In one aspect, the system can perform connectivity extraction by accessing a database in memory (or an open access database) to search for gates that are connected to a respective user-specified net. Specifically, the system can search for a label (e.g., a label can correspond to a user-specified net naming mechanism) and then determine a first set of net shapes that are overlapping or located within a first threshold proximity with the label and a second set of net shapes that are overlapping or located within a second threshold proximity with the first set of net shapes, etc., until remaining overlapping or neighboring shapes are discovered. The system can process these shapes to identify the lowest-level blocks associated with the user-specified nets. For example, in a clock network the system may find buffers (lowest-level blocks or leaf-cells) associated with a respective clock net.

The system can then extract the leaf-cells and the second list of nets from the first design layout (operation 410). The system can copy these extracted leaf-cells and the second list of nets to a second view on the GUI to represent a second design layout (operation 412). In other words, the system can copy certain parts of the first design layout the user is interested in into a new design or new view, i.e., the second design layout. The second view on the GUI includes a visual representation of the second design layout and the system can enable the user to view, interact, and analyze the second design layout via the GUI. Specifically, the system can provide a user-interactive feature via the GUI to enable the user to interact with the design.

To incorporate, into the second design layout, the parasitic effects of other net shapes on the selected nets, the system may determine net shapes near the selected second list of nets that can have a parasitic effect on the selected nets (operation 416). The system can then extract these nets shapes and copy them to the second view on the GUI, thereby including the parasitic components that might have an impact on the second list of nets and including the parasitic context of the first design layout in the second design layout (operation 418). Specifically, the system may copy these other net shapes along with their location in the first design layout and their parasitic impact on the net shapes associated with the selected nets. For example, the system may copy the geometric parameters, i.e., length, width, location of metal traces, etc., associated with the other net shapes to the second design layout. In one aspect, the system may perform operations 416 and 418 in parallel with operations 408-412 or after operations 408-412. The system may provide the second design layout to a layout parameter extraction process (operation 414). Applying the layout parameter extraction tool to the second design layout can result in significant reduction of runtime and memory usage.

Computer System

Figure 5:
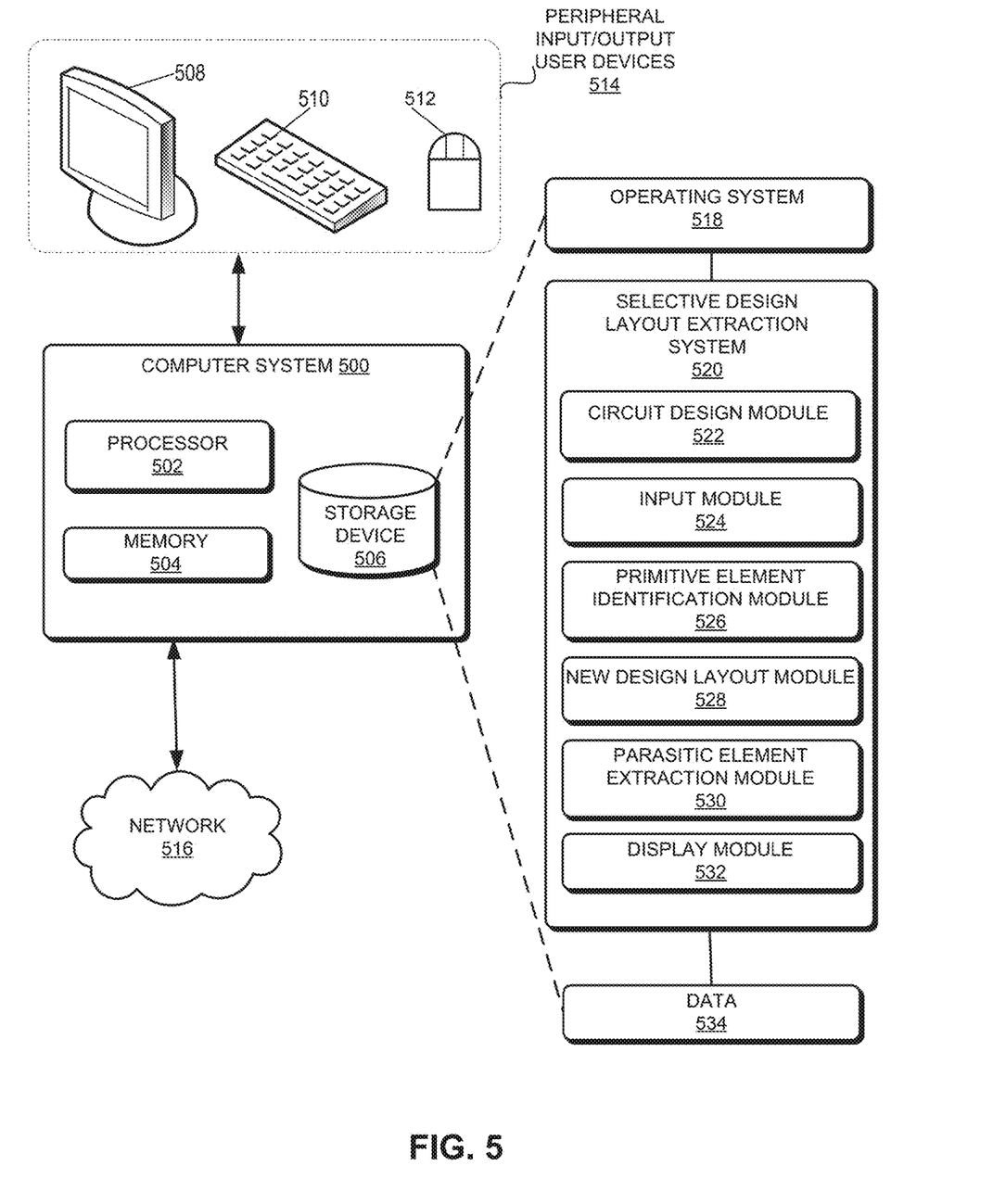
FIG. 5 illustrates an exemplary computer system that facilitates selective extraction of a design layout, according to one aspect of the instant application.

FIG. 5 illustrates an example computer system that facilitates selective extraction of a design layout, according to one aspect of the instant application. In this example, computer system 500 can include a processor 502, a memory 504, a storage device 506. Computer system 500 can be coupled to peripheral input/output (I/O) user devices 514, e.g., a display device 508, a keyboard 510, and a pointing device 512. Storage device 506 can store instructions for an operating system 518, a selective design layout extraction system 520, and data 534. Data 534 can include any data that is desirable as input or that is generated as output by the methods and/or processes described in this disclosure. Computer system 500 can be coupled via one or more network interfaces to a network 516.

In one aspect of this application, selective design layout extraction system 520 can include instructions, which when executed by processor 502 can cause computer system 500 to perform methods and/or processes described in this disclosure. Selective design layout extraction system 520 can include a circuit design module 522 to receive/obtain a semiconductor circuit design. Circuit design module 522 can further generate a first list of nets or a schematic for the circuit design and generate a first visual representation of the circuit design. Selective design layout extraction system 520 can implement a display module 532 to display on a display device 508 the first visual representation of the circuit design via a GUI in a first view.

Selective design layout extraction system 520 can further include instructions for implementing an input module 524 for receiving a user-specified list of nets via user-interactive elements provided on the GUI. This user-specified list of nets, e.g., clock nets, that the user is interested in analyzing the parasitic effects on the selected nets and verifying the correct operation of the selected nets. Therefore, input module 524 can provide the users the advantage of providing a subset of nets from the large set of nets in the circuit design.

Selective design layout extraction system 520 can include a primitive element identification module 526 to trace the user-specified nets, e.g., clock nets, to identify primitive elements or fundamental logic blocks, e.g., buffers associated with the clock nets. Selective design layout extraction system 520 can apply new design layout module 528 to generate, based on the net shapes associated with the user-specified nets and the primitive elements, a second visual representation of a new design layout and a corresponding schematic. New design layout module 528 can further apply display module 532 to display the second visual representation of the new design layout in a new view on the GUI.

The new design layout may not include the nets that the user has not specified. Since the user-specified nets are significantly small when compared to the total number of nets in the given circuit design, the user has the advantage of viewing, analyzing, and interacting with the displayed new design layout, which otherwise would have been a challenging task. For example, the user can interact with the new design layout to select and remove one or more parts in the new design layout. New design layout module 528 can then update the new design layout accordingly. In another example, the user may desire to include additional nets to the new design layout. In such a case, the user can interact with the GUI and select additional nets from the first list of nets. System 520 may apply modules 524, 526, 528, and 530 to generate an updated new design layout. Furthermore, since the number of nets in the new design layout is significantly small when compared to the number of nets in the design layout, applying a layout parameter extraction tool to the new design layout and the schematic can result in significant reduction of runtime, memory usage, and the time-to-market.

In one aspect of the application, selective design layout extraction system 520 can implement a parasitic element extraction module 530 to extract from the circuit design metal lines or parasitic elements near the user-specified nets that can have a parasitic effect on the user-specified nets. Selective design layout extraction system 520 may then apply new design layout module 528 to copy the extracted parasitic elements to the second visual representation of the new design layout to generate an updated new design layout that includes the parasitic context of the larger design in the new design layout. Display module 532 may then update the new view displayed on the GUI. System 520 may provide the new design layout to a layout parameter extraction process. Since system 520 has generated a new design layout which is significantly smaller in size when compared to the design layout of the entire circuit block, applying the layout parameter extraction tool to the new design layout can result in significant reduction of runtime and memory usage.

One embodiment described in the present disclosure can provide a system and method for facilitating a selective extraction of design layout. During operation, the system can generate, based on an electronic circuit, a first list of nets and a first design layout corresponding to the electronic circuit. The list of nets correspond to electrical connections between circuit elements included in the electronic circuit. The system can display, via a graphical user interface, a visual representation of the first design layout. The system can receive, via one or more user interactive elements on the graphical user interface, a second list of nets including a first subset of nets from the first list of nets and determine, based on the second list of nets, a set of leaf-cells. A leaf-cell corresponds to a fundamental building block implementing a logic functionality in the electronic circuit. The system may extract the first subset of the nets and the set of leaf-cells from the first design layout and copy the extracted first subset of the nets and the set of leaf-cells to a new display on the graphical user interface to represent a new design layout. The system can then provide the new design layout to a layout parameter extraction process.

In a variation on this embodiment, the system can determine a second subset of nets in the first design layout that has a parasitic impact on the second design layout. The system can then extract the second subset of nets from the first design layout and copy the second subset of nets to the new design layout.

In a variation on this embodiment, the system can copy the second subset of nets to the new design layout by, copying a location associated with a respective net in the second subset of nets; and copying a parasitic impact of the net on the new design layout.

In a variation on this embodiment, a user provides the second list of nets via the graphical user interface in a text file format.

In a variation on this embodiment, the system can determine, based on the second list of nets, a set of leaf-cells by, tracing a respective net from the first subset of the nets to identify a corresponding leaf-cell connected to the net.

In a further variation, the system can generate a schematic for the first subset of the nets; generate, based on the extracted first subset of the nets and the set of leaf-cells, a second visual representation of the new design layout. The system can then display, via the graphical user interface, the second visual representation of the new design layout on the new display.

In a further variation, the system can create the new display on the graphical user interface for displaying a second visual representation of the new design layout.

In a further variation, the first subset of the nets can include at least a clock net; and a leaf-cell associated the clock net can include a buffer.

In a further variation, the system can copy the extracted first subset of the nets and the set of leaf-cells to the new display on the graphical user interface to represent the new design layout by, copying geometric dimensions associated with the first subset of the nets to the new design layout. The geometric dimensions can include length, width, and spacings associated with the first subset of the nets in the first design layout.

In a further variation, the system can, determine a circuit block associated with the first subset of nets; determine a first set of net shapes located within a first threshold proximity with the circuit block and a second set of net shapes located within a second threshold proximity with the first set of net shapes; and determine, based on the first set of net shapes and the second set of net shapes, one or more fundamental building blocks associated with the first subset of nets.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, ASIC chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A computer-implemented method comprising:
generating, based on an electronic circuit design, a first list of nets and a first design layout corresponding to the electronic circuit design, wherein the first list of nets corresponds to electrical connections between circuit elements included in the electronic circuit design;
displaying, via a graphical user interface, a first visual representation of the first design layout;
receiving, via one or more user interactive elements on the graphical user interface, a second list of nets including a first subset of user-selected nets from the first list of nets;
determining, based on the second list of nets and a circuit block associated with the user-selected nets, a first set of net shapes located within a first threshold proximity with the circuit block and a second set of net shapes located within a second threshold proximity with the first set of net shapes;
determining, based on the first set of net shapes and the second set of net shapes, a set of leaf-cells associated with the user-selected nets, wherein a leaf-cell corresponds to a fundamental building block implementing a logic functionality in the electronic circuit design;
extracting the user-selected nets and the set of leaf-cells from the first design layout;
copying the extracted user-selected nets and the set of leaf-cells to a new display on the graphical user interface to represent a new design layout; and
providing the new design layout to a layout parameter extraction process.

2. The computer-implemented method of claim 1, further comprising:
determining a second subset of nets in the first design layout that has a parasitic impact on the new design layout;
extracting the second subset of nets from the first design layout; and
copying the second subset of nets to the new design layout.

3. The computer-implemented method of claim 2, wherein copying the second subset of nets to the new design layout further comprises:
copying a location associated with a respective net in the second subset of nets; and
copying a parasitic impact of the net on the new design layout.

4. The computer-implemented method of claim 1, wherein a user provides the second list of nets via the graphical user interface in a text file format.

5. The computer-implemented method of claim 1, wherein determining the set of leaf-cells comprises:
tracing a respective net in the user-selected nets to identify one or more leaf-cells connected to the respective net.

6. The computer-implemented method of claim 1, further comprising:
generating a schematic for the user-selected nets;
generating, based on the extracted user-selected nets and the set of leaf-cells, a second visual representation of the new design layout; and
displaying, via the graphical user interface, the second visual representation of the new design layout on the new display.

7. The computer-implemented method of claim 1, further comprising:
creating the new display on the graphical user interface for displaying a second visual representation of the new design layout.

8. The computer-implemented method of claim 1, wherein the first subset of user-selected nets includes at least a clock net; and
wherein a leaf-cell associated the clock net includes a buffer.

9. The computer-implemented method of claim 1, wherein copying the extracted user-selected nets and the set of leaf-cells to the new display on the graphical user interface to represent the new design layout further comprises:
copying geometric dimensions associated with the user-selected nets to the new design layout, wherein the geometric dimensions include length, width, and spacings associated with the user-selected nets in the first design layout.

10. The computer-implemented method of claim 1, further comprising:
determining the circuit block associated with the user-selected nets; and
determining, based on the first set of net shapes and the second set of net shapes, one or more fundamental building blocks associated with the user-selected nets.

11. A computer system, comprising:
a processor; and
a memory coupled to the processor and storing instructions which, when executing by the processor, cause the processor to perform a method, the method comprising:
generating, based on an electronic circuit design, a first list of nets and a first design layout corresponding to the electronic circuit design, wherein the first list of nets corresponds to electrical connections between circuit elements included in the electronic circuit design;
displaying, via a graphical user interface, a first visual representation of the first design layout;
receiving, via one or more user interactive elements on the graphical user interface, a second list of nets including a first subset of user-selected nets from the first list of nets;
determining, based on the second list of nets and a circuit block associated with the user-selected nets, a first set of net shapes located within a first threshold proximity with the circuit block and a second set of net shapes located within a second threshold proximity with the first set of net shapes;
determining, based on the first set of net shapes and the second set of net shapes, a set of leaf-cells associated with the user-selected nets, wherein a leaf-cell corresponds to a fundamental building block implementing a logic functionality in the electronic circuit design;
extracting the user-selected nets and the set of leaf-cells from the first design layout;
copying the extracted user-selected nets and the set of leaf-cells to a new display on the graphical user interface to represent a new design layout; and
providing the new design layout to a layout parameter extraction process.

12. The computer system of claim 11, the method further comprising:
   determining a second subset of nets in the first design layout that has a parasitic impact on the new design layout;
   extracting the second subset of nets from the first design layout; and
   copying the second subset of nets to the new design layout.

13. The computer system of claim 12, wherein copying the second subset of nets to the new design layout further comprises:
   copying a location associated with a respective net in the second subset of nets; and
   copying a parasitic impact of the net on the new design layout.

14. The computer system of claim 11, wherein a user provides the second list of nets via the graphical user interface in a text file format.

15. The computer system of claim 11, wherein determining the set of leaf-cells comprises:
   tracing a respective net in the user-selected nets to identify one or more leaf-cells connected to the respective net.

16. The computer system of claim 11, the method further comprising:
   generating a schematic for the user-selected nets;
   generating, based on the extracted user-selected nets and the set of leaf-cells, a second visual representation of the new design layout; and
   displaying, via the graphical user interface, the second visual representation of the new design layout on the new display.

17. The computer system of claim 11, the method further comprising:
   creating the new display on the graphical user interface for displaying a second visual representation of the new design layout.

18. The computer system of claim 11, wherein the user-selected nets includes at least a clock net; and
   wherein a leaf-cell associated the clock net includes a buffer.

19. The computer system of claim 11, wherein copying the extracted user-selected nets and the set of leaf-cells to the new display on the graphical user interface to represent the new design layout further comprises:
   copying geometric dimensions associated with the user-selected nets to the new design layout, wherein the geometric dimensions include length, width, and spacings associated with the user-selected nets in the first design layout.

20. The computer system of claim 11, the method further comprising:
   determining the circuit block associated with the user-selected nets; and
   determining, based on the first set of net shapes and the second set of net shapes, one or more fundamental building blocks associated with the user-selected nets.

* * * * *